Patented Aug. 8, 1944

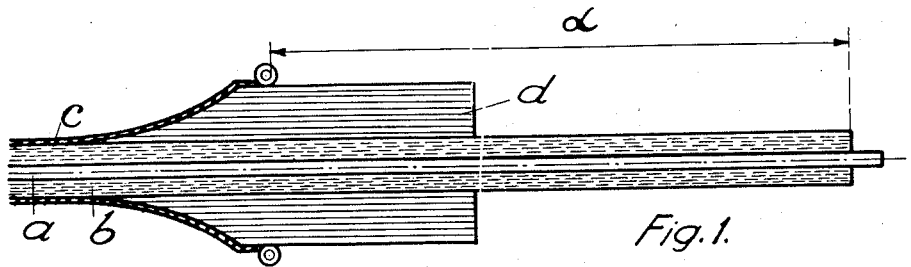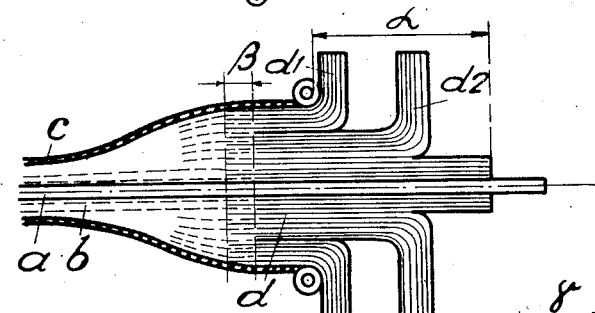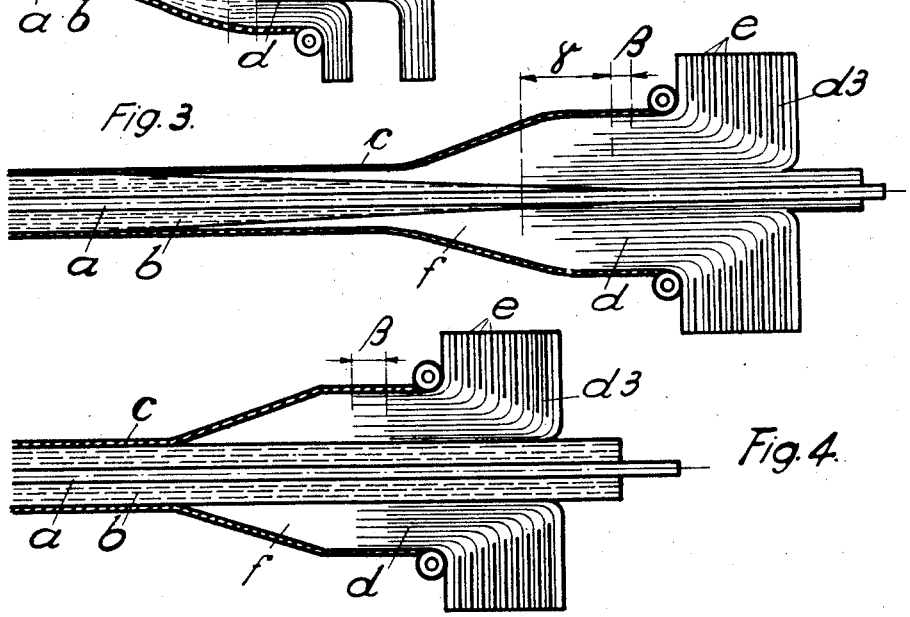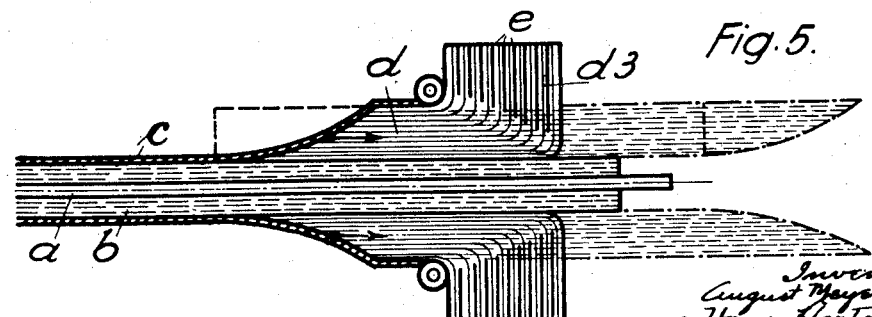

2,355,545

UNITED STATES PATENT OFFICE 2,355,545

CABLE JOINT OR TERMINAL

August Meyerhans, Rieden, near Baden, and Hans Hartmann, Baden, Switzerland, assignors to Aktiengesellschaft Brown, Boveri & Cie., Baden, Switzerland, a joint-stock company Application April 3, 1942, Serial No. 437,588
In Switzerland April 15, 1941

7 Claims. (Cl. 174—74)

Although the advances achieved in the cable industry enable cables to be manufactured for very high voltages, the cable joint represents an element which with the present methods of insulating is not entirely proof against disturbances. The reason for this is that a leakage path can extend from the metal sheath, which is generally earthed, to the conductor which is at a high potential. With paper insulated conductors it is known to increase the thickness of the insulation at joints or terminals of the conductor, when compared with the rest of the insulation of the conductor, by means of additional layers of paper, so that the stresses in the insulating material in the direction perpendicular to the stratification of the paper layers are more favourable. The leakage path along the paper layers between the insulation of the conductor and the thicker portion of the insulation remains, however, and the leakage path α has to be very long (Fig. 1). Since the additional paper layers forming the thicker end portion have to be wound by hand on to the insulation of the conductor there is a danger of a joint remaining between this latter and the additional layers of the thicker portion, this joint providing a leakage path for the discharge.

An object of the invention is to provide a joint or terminal construction, for a high-voltage conductor having a paper insulation of a larger diameter at the end of the conductor, that overcomes the aforementioned disadvantages. More specifically, an object is to provide a joint or terminal construction, for a metal-sheathed cable of the type stated, in which the thicker paper insulation portion includes at least one flange-like collar in which the paper layers are arranged approximately perpendicularly in the discharge path between the end of the conductor and the grounded metal sheath.

These and other objects and advantages of the invention will be apparent from the following specification when taken with the accompanying drawing in which:

Fig. 1 is a diagrammatic longitudinal section through the end portion of a cable upon which additional layers of insulating material are wound;

Fig. 2 is a longitudinal section through the end portion of a cable having added insulating layers that are turned outwardly, in accordance with this invention, to form radially extending collars;

Figs. 3 and 4 are longitudinal sections through other embodiments in which annular insulating layers are arranged between adjacent flange or collar members to increase the axial length of the collar; and Fig. 5 is a longitudinal section through another embodiment of the invention, the broken lines showing the additional insulating layers as originally wound on the cable.

In all the figures $a$ is the conductor core which is covered with several layers of paper strip insulation $b$ on top of which the grounded metal sheath $c$ is arranged. The paper insulation $d$ which strengthens the paper strip insulation of the conductor is at least at the outer end wound from a paper roll. The free edge of this reinforced insulation bandage is slit to form at least one flanged collar which is bent back at this end.

The additional paper insulation that is subsequently turned outwardly, at its outer end, to form the collar, can be applied by winding the paper roll together with and as a continuation of the paper strip insulation of the conductor core in one and the same operation and in such a manner that the edges of the layers $b$ of the paper strip and layers $d$ of the paper roll insulation overlap by an amount $\beta$ (see Fig. 2). The place where the two kinds of paper insulation overlap can also be displaced towards the end of the conductor core, as indicated for instance in Fig. 3 by the distance $\gamma$. In order to obtain a smooth transition from the conductor insulation $b$ to that of the strengthened paper insulation $d$, a conical insertion $f$ is included in the insulation winding in both cases, this also being constructed from wound paper strip.

With the arrangement according to the invention the paper layers $d$ as in the case of the insulation $b$ of the conductor are stressed in a direction approximately perpendicular to the plane of the insulation layers when a breakdown occurs, with the result that the insulation is better utilized and the length $\alpha$ of the terminal insulation is reduced. The overlap provided for the paper strip and paper roll insulation diminishes the formation of continuous leakage paths.

Instead of the flange-like collars $d_1$, $d_2$ shown in Fig. 2 formed by bending back the layers of the strengthened insulation $d$, a single thicker collar $d_3$ can be formed by spreading the paper layers and inserting intermediate layers $e$ of insulating material as illustrated in Fig. 3.

As shown in Fig. 3 it is also possible to taper the paper strip insulation $b$ of the conductor core, and by means of a special operation the strengthened paper insulation of the end flange $d$ can be formed on the tapered paper strip insulation by using paper strip for the beginning of the insulation winding which is overlapped by the paper roll at the end which is bent back to form the collars. Fig. 4 shows an end insulation constructed by a special winding operation, the paper strip insulation of the conductor core not being tapered in this case.

The strengthening of the paper insulation of the conductor core can also be achieved, as shown in Fig. 5, by winding a tube of paper roll insulation direct on to the conductor insulation or winding such a paper tube separately and bringing this tube from the position indicated by the broken lines to that indicated by the dash-dot lines by displacing the paper layers whereupon the flange-like collars $d_3$ with the inserted intermediate layers $e$ or several such collars are formed.

The strengthened paper insulation for the end construction can be produced either by hand or by machine.

We claim:

1. A joint structure for an electrical cable within and insulated from a metal sheath by wrapped layers of insulation, said joint structure including in combination with a cable end from which the sheath has been cut back to expose the conductor, of wound layers of insulating material increasing the thickness of the insulation about the unsheathed cable end to substantially more than the thickness of the insulation within the sheath, the outer end portions of said wound layers being turned outwardly to form a collar substantially normal to the conductor.

2. A joint structure as recited in claim 1, wherein the outer end portions of the wound layers are turned back at axially spaced regions to form a plurality of spaced collars.

3. A joint structure as recited in claim 1, in combination with layers of insulation positioned between adjacent turned-back sections of the wound layer to increase the axial length of the collar.

4. A joint structure as recited in claim 1, wherein the inner ends of the wound layers of insulation are interleaved with the outer ends of the wrapper layers of insulation.

5. A joint structure as recited in claim 1, wherein the wound layers of insulating material are prewound and applied over the wrapped layers of conductor insulation.

6. A joint structure as recited in claim 1, wherein the outer end of the wrapped layers of conductor insulation is tapered, and the wound layers overlap the tapered conductor insulation.

7. A joint structure as recited in claim 1, wherein the outer end of the wrapped layers of conductor insulation is tapered, and a conical insert of insulating material encloses the tapered end of the conductor insulation.

AUGUST MEYERHANS.
HANS HARTMANN.